M. H. EAST.
REAPER THRESHER.
APPLICATION FILED JUNE 15, 1914.
1,121,814.
Patented Dec. 22, 1914.
2 SHEETS—SHEET 2.
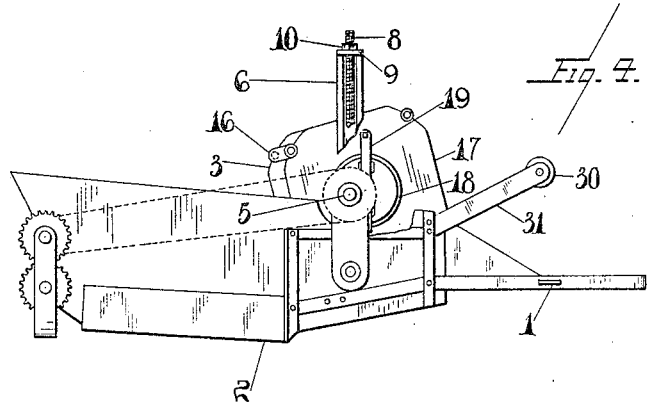
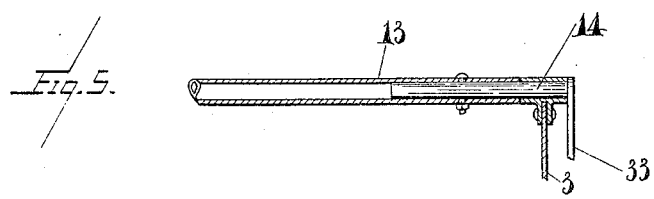
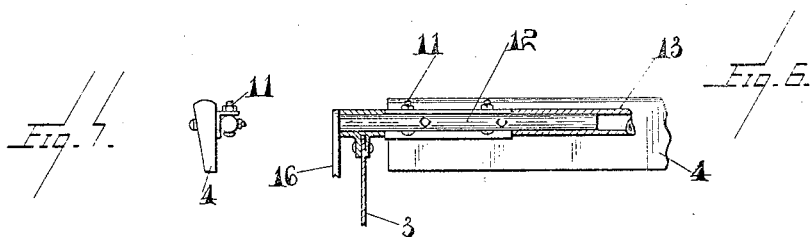
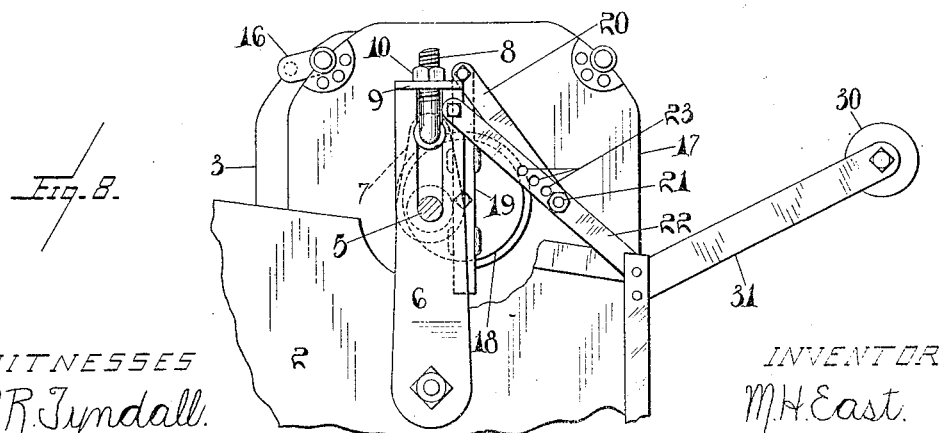
WITNESSES
N. R. Tyndall.
E. P. Hall.
INVENTOR
M. H. East.
BY J. Edward Maybee.
ATTY

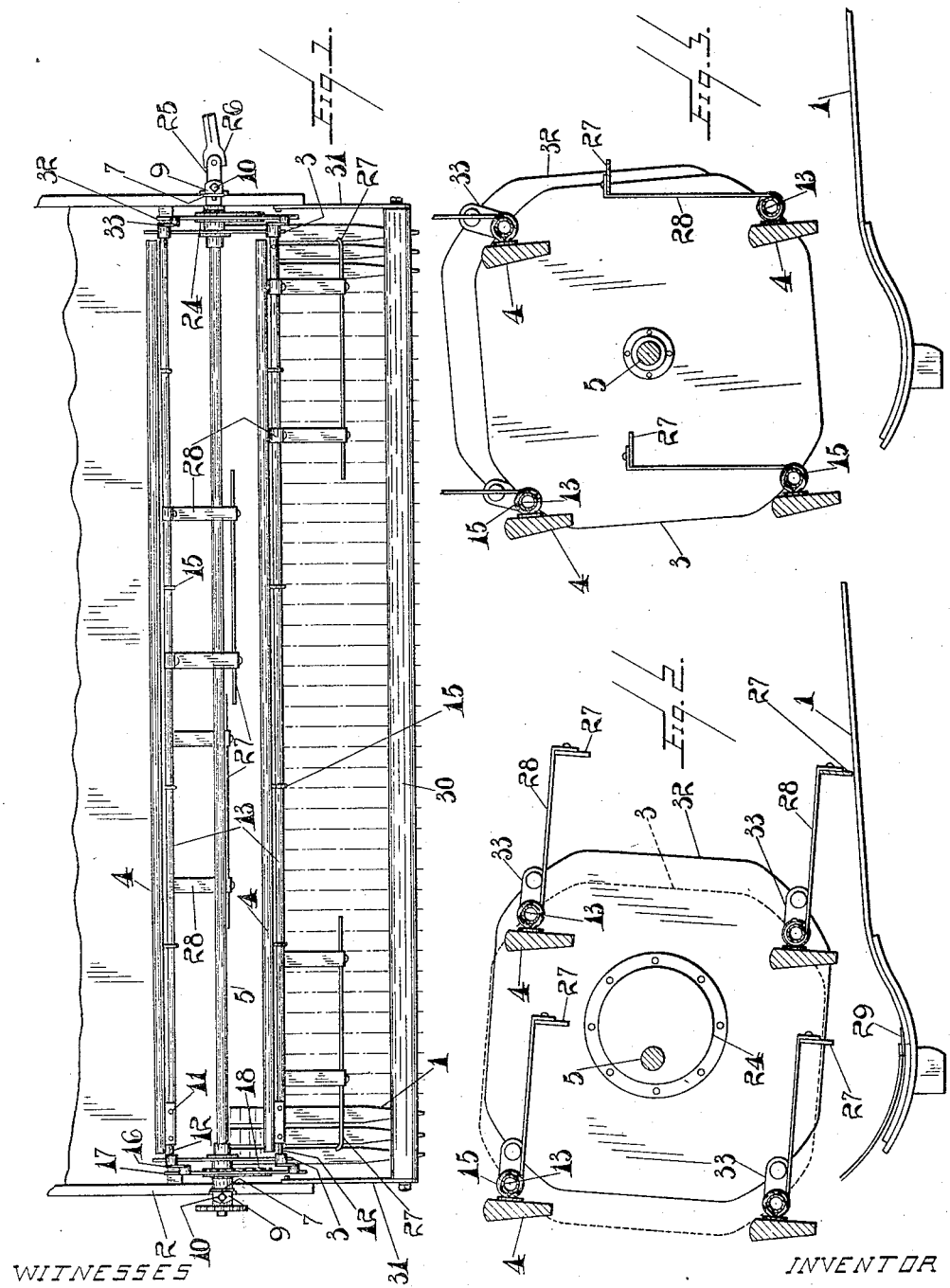

UNITED STATES PATENT OFFICE.

MATTHEW HENRY EAST, OF TORONTO, ONTARIO, CANADA, ASSIGNOR TO MASSEY-HARRIS COMPANY, LIMITED, OF TORONTO, CANADA.

REAPER-THRESHER.

1,121,814.  Specification of Letters Patent.  Patented Dec. 22, 1914.

Application filed June 15, 1914. Serial No. 845,153.

*To all whom it may concern:*

Be it known that I, MATTHEW H. EAST, of the city of Toronto, in the county of York, Province of Ontario, Canada, have invented certain new and useful Improvements in Reaper-Threshers, of which the following is a specification.

This invention relates to harvesters of the type in which the heads only of the grain are cut off leaving most of the straw in the stubble. Such harvesters use long toothed combs to catch the standing grain and guide the heads to the knife. In connection with the comb a rotating reel is employed to draw the grain against the knife. This reel is effective with even, straight-standing grain, but when the grain is tangled or lying down it sometimes happens that heads become stuck in the comb in front of the knife and it becomes necessary to stop the machine and clear the comb.

My present object is to provide means which may instantly be thrown into action by the operator for clearing the comb.

I attain my object by providing the reel with a series of hinged scrapers which may, by means of mechanism controllable by the operator, be extended to reach forward over the comb and to pass rearwardly in contact therewith and thus drag back to the knife any heads of grain caught in the comb. The whole is constructed in detail substantially as hereinafter described and illustrated in the accompanying drawings in which—

Figure 1 is a plan view of part of a header harvester provided with my improvements; Fig. 2 a vertical section on an enlarged scale showing the reel and comb of a header-harvester provided with my improvements; Fig. 3 is a similar view showing the scrapers of the reel in a different position; Fig. 4 is a side elevation of the parts shown in Fig. 1; Figs. 5 and 6 are longitudinal sections showing the means of concentrically pivoting the scrapers and reel blades; Fig. 7 is an end elevation showing a reel blade connected to its journal rod; and Fig. 8 is a detail end elevation on the same scale as Figs. 2 and 3 showing the adjustment of the eccentric for adjusting the angle of the reel blades.

In the drawings like numerals of reference indicate corresponding parts in the different figures.

1 is the comb of a header-harvester such as shown in my co-pending United States application No. 703272, filed June 12, 1912, 2 being part of the frame of the apparatus suitably shaped to support the different parts.

The reel of the apparatus comprises the end frames 3 and the blades 4 which are journaled thereon in the manner to be hereinafter described. The end frames 3 are preferably formed as disks secured to the axle 5. This axle is preferably supported on the frame 2 so that the reel as a whole may be vertically adjusted. For this purpose I provide the upright guides 6 formed on or secured to the frame 2 and slotted to receive the axle. The axle is supported and vertically adjusted in these guides by means of the links 7 which are connected with the threaded hooks 8 which pass through the lugs 9 formed at the upper ends of the guides 6 and are vertically adjusted relative thereto by means of the nuts 10.

The blades 4 are secured by means of the bolts 11 to the journals 12 which are journaled as shown in the left hand end frame 3. On these journals are sleeved the sleeves 13 which extend from end to end of the reel. Each sleeve at its right hand end has a journal 14 secured therein, and these journals are provided with bearings in the right hand end disk 3, the reel blades 4 are also journaled on the sleeves 13 by means of the staples or straps 15 which are suitably secured to the blades and embrace the sleeves as shown. The blades are as usual provided with means for maintaining them at a constant angle to the comb as the reel rotates. For this purpose I prefer to use the construction I now describe.

Each of the journals 12 has a crank arm 16 secured thereto. Each crank arm is pivotally connected with a disk 17 which forms in effect an eccentric strap for the eccentric 18. This eccentric is so supported that when the reel is in rotation the eccentric is stationary. The result of this construction is that through the medium of the crank arms the journals 12 are so held that the reel blades 4 maintain a constant angle to the comb. It is also evident that by angularly adjusting the eccentric the angle of the blades to the comb may be varied as desired. An arrangement for this purpose is shown in Fig. 8. The eccentric 18 is shown as journaled on the axle 5 so that it is supported thereby. Secured to the eccentric is an arm 19 to the outer end of which is pivotally connected a link 20. This link 20 is connected by means of a bolt 21 with a strap 22 forming part of the end frame of the apparatus. A plurality of holes 23 are provided so that the link 20 may be connected with the strap in different positions. Thus the eccentric may be rotated as desired within the limits determined by the number and position of the holes 23. An eccentric 24 is provided at the other end of the reel but its adjusting means is differently arranged as the adjustment must be effected instantaneously while the machine is in operation. I therefore show a spindle 25 provided with a universal joint 26 and connected directly to the eccentric. By adjusting this spindle 25 the eccentric 24 may be quickly adjusted whenever desired. The spindle will lead to a convenient position for the operator of the machine and will of course be provided with any suitable means for holding it as adjusted. As such means form no essential part of the invention and may be of any desired type it is not illustrated in the drawings. The eccentric is provided with the disk shaped eccentric strap 32 in which are journaled the ends of the cranks 33 secured to the journals 14 of the sleeves 13.

The purpose of the sleeves 13 is to carry the scrapers 27. These scrapers are formed of flat bars secured to the arms 28 which are secured to the sleeves 13. One scraper is connected to each of the sleeves 13 and each scraper is less in length than the total length of the reel while the total length of the scrapers is substantially equal to or very little greater than the length of the reel. When four scrapers are used on the reel each scraper is preferably about one fourth the length of the reel, though a slight overlap of the scrapers is preferable as shown in Fig. 1. The scrapers will thus, when extended as shown in Fig. 2, operate successively.

Under normal conditions the reel is sufficient to properly bring the heads of the grain to the knife, the position of which is indicated at 29 in Fig. 2. It frequently happens however in handling the grain in down and tangled crops that some of the heads stick between the teeth of the comb forward of the reel, and the effective operation of the apparatus is thus prevented until the comb has been cleared. Under normal conditions the eccentric at the left hand end of the reel is so adjusted by means of the spindle 25 that the scrapers lie in the position shown in Fig. 3, i. e., the arms 28 supporting them lie in a plane substantially parallel to the blades 4. When, however, heads become stuck in the comb the eccentric 24 is rotated so as to cause the scrapers to lie at the angle shown in Fig. 2. In this position, as will be seen, they will consecutively touch the comb well forward of the knife and scrape rearwardly over it thus effectively clearing it of any heads which may have been caught in it. It is evident that by still further rotating the eccentric the scrapers might be made to occupy a position in which their carrying arms are substantially radial to the reel. In this position the scrapers form the blades of a reel of extended diameter. If the scrapers be so adjusted it is necessary to elevate the reel as a whole by adjusting the nuts 10 on the hooks 8. Under some conditions a reel of extended diameter as described possesses material advantages.

It will be seen that as the adjustment for the scrapers is entirely independent of the adjustments for the reel blades that the scrapers may be brought into action at any time no matter what the adjustment of the reel blades may be.

In the drawings I show the breasting bar 30 supported from the frame 2 by means of the arms 31 but this construction is of course common in reaper harvesters.

It will be understood of course that I do not desire to limit myself to the exact means described of providing for the supporting and adjusting of the scrapers 27, the important point being that the reel blades shall be capable of at any time being adjusted to any angle relative to the comb and so supported that they maintain that angle during the rotation of the reel. Any means may be employed for rotating the reel.

What I claim as my invention is:

1. In a reaper-thresher the combination of a comb; a reel journaled above said comb; a plurality of bars journaled longitudinally on the reel; scrapers secured to said bars; and means for angularly adjusting said bars to vary the position of the scrapers relative to the comb and reel and for maintaining them constantly at the angle to which they are adjusted during the rotation of the reel.

2. In a reaper-thresher the combination of a comb; a reel journaled above said comb; a plurality of bars journaled longitudinally on the reel; scrapers secured to said bars; and means for angularly adjusting said bars to vary the position of the scrapers relative to the comb and reel and for maintaining them constantly at the angle to which they are adjusted during the rotation of the reel comprising a crank arm on each of said bars, an eccentric rotatably supported on the frame, eccentric strap for said eccentric to which each crank arm is connected, and means for angularly adjusting said eccentric.

3. In a reaper-thresher the combination of a comb; a reel journaled above said comb comprising end frames and blades journaled therein; a plurality of bars journaled on said end frames; scrapers secured thereto; means for maintaining the blades at a given angle to the comb as the reel rotates; means for maintaining the scrapers at a given angle relative to the comb; and means for varying said angle at will.

4. In a reaper-thresher the combination of a comb; a reel journaled above said comb comprising end frames and blades journaled therein; a plurality of bars journaled on said end frames; scrapers secured thereto; means for maintaining the blades at a given angle to the comb as the reel rotates; means for varying the said angle at will; means for maintaining the scrapers at a given angle relative to the comb; and means independent of the reel blade adjustment for varying said angle at will.

5. In a reaper-thresher the combination of a comb; a reel journaled above said comb; a plurality of bars journaled longitudinally on the reel; scrapers secured to said bars; means for angularly adjusting said bars to vary the position of the scrapers relative to the comb and reel and for maintaining them constantly at angle to which they are adjusted during the rotation of the reel; and means for vertically adjusting the reel.

6. In a reaper-thresher the combination of a comb; a reel journaled above said comb comprising end frames and blades journaled therein; a plurality of bars journaled on said end frames concentric with the journals of the reel blades; scrapers secured thereto; crank arms connected with the journals of the blades at one end; crank arms connected with the bars at the other end; means for maintaining the blades at a given angle to the comb as the reel rotates; and means for angularly adjusting said bars to vary the position of the scrapers relative to the comb and reel and for maintaining them constantly at the angle to which they are adjusted during the rotation of the reel comprising a crank arm on each of said bars, an eccentric rotatably supported on the frame, eccentric strap for said eccentric to which each crank arm is connected, and means for angularly adjusting said eccentric.

7. In a reaper-thresher the combination of a comb; a reel journaled above said comb; a plurality of bars journaled longitudinally on the reel; scrapers secured to said bars; and means for angularly adjusting said bars to vary the position of the scrapers relative to the comb and reel and for maintaining them constantly at the angle to which they are adjusted during the rotation of the reel, the scrapers each being in length less then the length of the reel and the total length of the scrapers substantially equal to the length of the reel.

8. In a reaper-thresher the combination of a comb; a reel journaled above said comb comprising end frames and blades journaled therein; a plurality of bars journaled on said end frames; scrapers secured thereto; means for maintaining the blades at a given angle to the comb as the reel rotates; means for maintaining the scraper at a given angle relative to the comb; and means for varying said angle at will, the scrapers each being in length less than the length of the reel and the total length of the scrapers substantially equal to the length of the reel.

Toronto, Ont., this sixth day of June A. D. 1914.

MATTHEW HENRY EAST.

Signed in the presence of—
  JAMES BYARD WARNOCK,
  BAMBER MILTON HANNIGAN.

Copies of this patent may be obtained for five cents each, by addressing the "Commissioner of Patents, Washington, D. C."